DATA RECORD AND SENSING MEANS THEREFOR

Filed Nov. 3, 1964

INVENTOR
GUNNAR E. SUNDBLAD by
Mason, Kolehmainen,
Rathburn and Wyss
ATTORNEYS.

United States Patent Office 3,359,405

Patented Dec. 19, 1967

3,359,405

DATA RECORD AND SENSING MEANS THEREFOR

Gunnar E. Sundblad, Bromma, Sweden, assignor to Svenska Dataregister AB, Solna, Sweden, a corporation of Sweden Filed Nov. 3, 1964, Ser. No. 408,484

3 Claims. (Cl. 235—61.11)

This invention relates to a record means and, more particularly, to a new and improved record element and method of manufacture thereof.

One of the most common data records is a punched card or price tag on which data is stored by placing perforations at selected points in code areas or fields. This general type of differential record also has been provided in a form in which magnetic material is placed at the selected points in the code fields or the perforations are used to selectively expose an electrically conductive material forming a part of the record card. These records cannot be correctly read or sensed unless the record element is accurately located or oriented relative to the reading device, and the necessary locating apparatus and operations frequently increase the cost of the reading unit and the time required to reproduce the stored data. In addition, since these records are usually made in a uniplanar form, any distortion in the form of the record can result in inaccurate data reproduction. This is particularly true of records having magnetic portions or electrically conductive surfaces.

A record element that obviates many of these problems is disclosed in a pending application No. 288,996, filed June 19, 1963. This record element is divided into code recording areas by elongated and spaced parallel lines of nonreflective material, and the resulting elongated code areas are selectively provided with different light reflecting characteristics representing binary "0's" and "1's" to provide a coded data record. This type of record provides a positive control over the synchronization of bit reproduction but is dependent on the selective reflection of light of different frequencies. This selective response to reflected light of different frequencies can, in some applications, entail more components in the record reader than are desirable.

Accordingly, one object of the present invention is to provide a new and improved data record.

Another object is to provide a new and improved method of recording or storing data on the record.

Another object is to provide a record that is easily and accurately read in either a uniplanar or a distorted form.

Another object is to provide a data record having spaced alternate and elongated areas of nonreflective and reflective characteristics in which the widths of either the reflective areas or the nonreflective areas are varied in accordance with the data to be recorded.

Another object is to provide a method of storing data on a record element in which the surface of the record element is divided into alternate areas of reflective and nonreflective characteristics in which the widths of the reflective or nonreflective areas are varied in accordance with the data to be recorded.

In accordance with these and many other objects, an embodiment of the present invention comprises a record element, tag, or card having a surface that is divided into parallel and contiguous alternate nonreflective and reflective areas. In one application, the record card can be formed with a light reflective surface that is divided into a plurality of parallel areas or lines by spaced parallel lines or areas of nonreflective material. The widths of the spaced nonreflective areas are made one of two different values representing binary "1's" and "0's" in accordance with the data item to be recorded. The greater width is made at least as large as an opening for supplying reflected light to a photosensitive unit in a record reader, and the lesser width is made less than the size of the opening.

As an example, one surface of a record card or tag having a light reflective characteristic is provided with a plurality of spaced nonreflective lines formed, for instance, of ink or dye which divide the reflective surface of the tag into a plurality of spaced and elongated areas which alternate between a reflective and a nonreflective characteristic. If, for example, a decimal data entry is to be recorded on the record using a binary code, the nonreflective areas or lines are considered in separate groups including four areas representing the binary values "1," "2," "4" and "8." The widths of the four nonreflective areas in each group are selectively made wide or narrow representing binary "1's" and "0's," respectively, in accordance with a binary coded representation of the data item to be recorded.

The record can then be scanned by reading means including a light source and a light sensitive cell responsive to the light reflected from the normal reflective surface and transmitted through a window or opening of a size the same as the wider width of the nonreflective lines or areas. In response to relative movement between the reading means and the record, the light sensitive cell receives full illumination from light received from the reflective areas and is either completely deprived of reflected light by the wide nonreflective areas which cover the entire transmitting opening and which represent binary "1's" or only partially deprived of reflected light by the narrower areas representing binary "0's." Thus, the light sensitive cell supplies pulsating or alternating signals varying in amplitude in accordance with the recorded data as relative movement is produced between the record and the reading means. Further, the recorded data can be accurately reproduced without requiring accurate orientation of the record relative to the reader merely by insuring that the reader passes in a single direction along a path intersecting the first and last of the nonreflective lines carried on the record element.

Many other objects and advantages will become apparent from considering the following detailed description in conjunction with the drawing in which.

Figure 3:
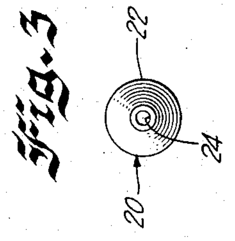
FIG. 3 is a bottom view of the reading unit shown in FIG. 2.

Referring now more specifically to the drawing, therein is illustrated a record card 10 which embodies the present invention and which includes a plurality of spaced and elongated nonreflective lines or areas 12, 14 extending transverse to the length of the record element or tag 10 to define a plurality of parallel discrete areas 16 which have a light reflecting characteristic. The widths of the lines or areas 12, 14 is varied in accordance with a coded representation of the data item to be recorded. When the record card 10 is scanned or sensed, the regular alternation of reflective and nonreflective areas provides positive steering or synchronization of the reproduced data bits, and the varying widths of the nonreflective areas 12, 14 provides binary "1" or "0" information.

In one embodiment, the record element is formed of paper or card stock or any other suitable material and is provided with a white or other surface having a light reflecting characteristic. The plurality of transversely extending nonreflective areas or lines 12, 14 are formed in spaced parallel positions on the reflective surface of the record element 10 by printing with ink, by impregnation with a dye, or by the selective deposition of a suitable nonreflective layer. The width of the line or area 16 measured in a direction transverse to its direction of elongation is substantially the same as the width of the line or area 12, and the width of the area or line 14 is about half of the width of the areas 12 and 16. The length of the areas 12, 14 and 16 preferably is at least ten times the width thereof.

In recording data on the record element 10, the various nonreflective areas 12, 14 are divided into groups or fields representing different items of data and control functions. If the record element 10 is, for example, to be supplied with data representing a price of "1.25" and a control number "8" which can represent a department or item designation, an uppermost field I is assigned to a start code. A next field II is assigned to a parity bit, and four following fields III–VI are assigned to the control digit "8" and the price "1.25" expressed in inverse order, i.e. "5, 2, 1." Each of the four fields III–VI includes four nonreflective areas 12, 14 assigned to the binary values "1," "2," "4" and "8" in descending vertical order. The binary bit "1" is represented by a wide nonreflective area 12, and the binary "0" is represented by a narrow nonreflective area 14.

According, when the digit "1" in the article price is to be recorded in the lowest field VI, the three lowermost nonreflective areas representing "8," "4" and "2" are formed or printed as narrow areas or lines 14 representing binary "0's." The uppermost nonreflective area representing "1" is formed or printed as a wide line or area 12 representing a binary "1." The lines 12 and 14 are easily formed by applying, for instance, a colored ink, a dye, or a deposited layer. Thus, in the lowest field VI, the lower three areas 14 and the upper line 12 represent an absence of the binary values "2," "4" and "8" and the presence of the binary value "1," i.e., 0001, in accordance with the desired value "1" to be recorded. Similarly, in the field V, the second digit "2" in the price of the article is represented by narrow nonreflective areas 14 in the first, third and fourth positions indicating the absence of the binary values "1," "4" and "8." The line 12 in the second position represents the presence of the binary bit "1" corresponding to the binary value "2," i.e., 0010. In a similar fashion, the next two fields IV and III are provided with patterns or combinations of the areas 12 and 14 to form the binary codes 0101 and 1000 in accordance with the third digit "5" of the price and the digit "8" representing control or other information.

Figure 1:
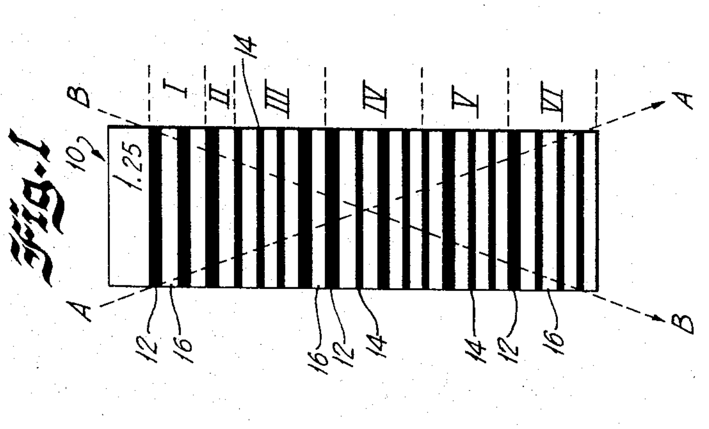
FIG. 1 is a plan view of a data record embodying the present invention.

The remaining fields I and II on the record card 10 are used to provide additional control information. The upper field I includes two wide nonreflective areas 12 which are used to provide a start or synchronizing signal to insure that the record 10 can be sensed or read only when relative movement between the record and reading means is produced in a particular direction. The single wide nonreflective area 12 in the field II is provided for a parity check. The record illustrated in FIG. 1 is designed for an even parity check. Since the binary coded representations of the control digit "8" and the price "1.25" include five binary "1's" or wide areas 12 of nonreflective characteristics, the field II is formed to include a wide nonreflective line 12 representing the presence of an additional binary "1" to provide a total number of binary "1's" equal to six. This provides an even parity check. On the other hand, if the total number of binary bits in the four lower code fields III–VI is an even number, the field II includes a narrow nonreflective area 14 representing a binary "0" to preserve the even parity check.

The data stored on the record card 10 can be sensed or read by apparatus of the type shown and described in detail in two pending applications Nos. 288,997 and 289,103. In general, the reading unit 20 (FIG. 2) comprises a housing 22 generally of the size and configuration of a pencil or a pen containing a light source for transmitting a small light beam through an opening 24 (FIG. 3) to impinge on the surface of the record 10. The housing 22 also includes a photoelectric sensing means which receives light through the opening 24 that is reflected from the reflective areas 16 on the record 10. The opening 24 is shown as circular but can have any suitable configuration. However, its size preferably is related to the width of the lines 12, 14 and 16. In a preferred embodiment, the size of the opening 24 is equal to or somewhat less than the width of the lines 12 and 16. With a circular opening 24, the diameter of this opening should be somewhat less than or equal to the width of the lines 12 and 16. The record 10 is sensed by producing relative movement between the reading device 20 and the record card 10 with either the record 10 or the reading device 20 held in a stationary position or both of these elements moved relative to each other.

Figure 5:
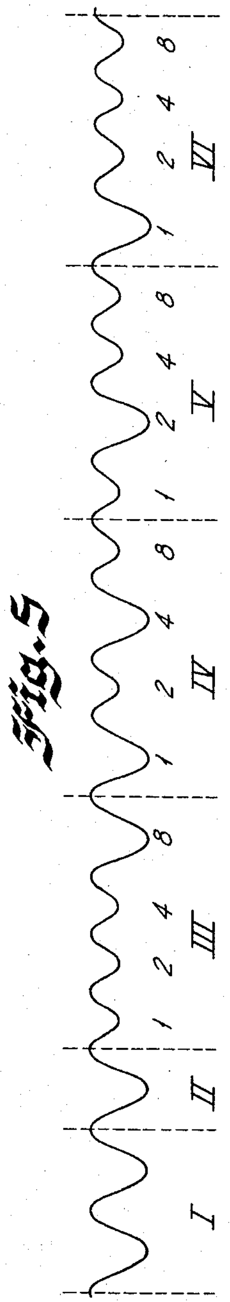
FIG. 5 illustrates a typical waveform produced by sensing the record shown in FIG. 1.

When the record 10 is to be read, the reading device 20 is placed adjacent the upper portion of the record 10, and relative movement therebetween is produced so that the light beam passes over the areas 12, 14 and 16 in sequence in a descending vertical order from the uppermost nonreflective layer or area 12. The two uppermost nonreflective areas 12 and the two uppermost reflective areas 16 control the photosensitive device in the reading unit 20 to forward the two consecutive large amplitude pulses or signals shown at I in FIG. 5 to a control circuit associated with the reader 20. As the opening 24 in the reader 20 moves from the upper portion of the record 10 to the uppermost nonreflective area 12, no light is reflected to the photocell, and the negative-going portion of the first pulse shown at I in FIG. 5 is produced. As the window 24 enters the uppermost reflective area 16, reflected light from the area 16, passes through the window 24 to impinge on the photocell, and the positive-going portion of the first pulse is produced. The second large amplitude pulse shown at I in FIG. 5 is produced in the same manner by the second area 12 and the second area 16 in the field I (FIG. 1).

The two larger amplitude signals provide a start code that enables the control system to receive the following information reproduced from the record. In this connection, it should be noted that scanning the record 10 in a reverse direction, i.e., from the lowermost reflective area 16 toward the uppermost, cannot result in a valid start code because a number having both of the binary values "4" and "8" represented by two lowermost lines or areas 12 on the record 10 does not have significance in a decimal system. Thus, two nonreflective areas 12 will not be encountered if the record 10 is scanned from its lower end toward its upper end.

The wide nonreflective area 12 and the corresponding reflecting area 16 in the field II (FIG. 1) provide a single large amplitude signal to supply a bit of information to the parity check circuit in the associated control circuit. The light beam then sequentially scans the three narrow lines 14 and the one wide area 12 with the interposed nonreflective areas 16 in the field III (FIG. 1) representing the value of the control digit "8". This generates the signals shown at III in FIG. 5. More specifically, as the opening 24 moves over the first narrow nonreflecting area 14, the light reflected from the record 10 and impinging on the photocell is reduced, but this reflected light is not reduced as greatly as when the opening passes over the wider area 12. Thus, the negative-going portion of the first signal shown at III in FIG. 5 is less in amplitude than that produced in I and II by the wide areas 12. The two remaining narrow areas 14 produce the next two smaller amplitude signals shown at III in FIG. 5, and the wide area 12 produces the large amplitude signal at the end of the field III. By controlling the relative widths of the areas 12 and 14, the differences between the "1" and "0" output signals can be controlled. As set forth above, the area 14 has a width substantially one-half that of the area 12 in a preferred embodiment.

The control circuit connected to the reader 20 differentiates between the smaller amplitude of the "0" representing signals resulting from the areas 14 and the larger amplitude of the "1" representing signals resulting from the wide area 12 to store "0001" in the connected register as a binary coded representation of the control digit "8". This register can preferably comprise a shift register to the input of which each reproduced "0" and "1" signal is supplied. Since the areas of a reflective character and a nonreflective character are repeated or alternated in a uniform manner, the train of signals (FIG. 5) resulting from the reflective-nonreflective transition on the record 10, of either a large or small amplitude, can be used to control the provision of shift signals for the shift register that are positively synchronized with the bit or intelligence input signals.

Continuing relative movement between the sensing device 20 and the record 10 scans the remaining sequence or pattern of reflective areas 16 and nonreflective areas 12, 14 to provide the series of signals shown in FIG. 5. As set forth above, each pulse or signal undulation can be used as a shift signal, and the different amplitudes thereof can be used to control the storage of binary "0's" and "1's."

Figure 4:
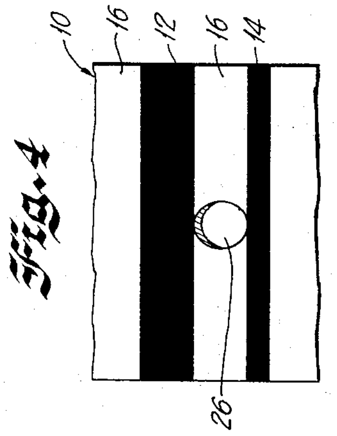
FIG. 4 is an enlarged fragmentary view of the record schematically illustrating the effect of inclining the reading unit relative to the record.
Figure 2:
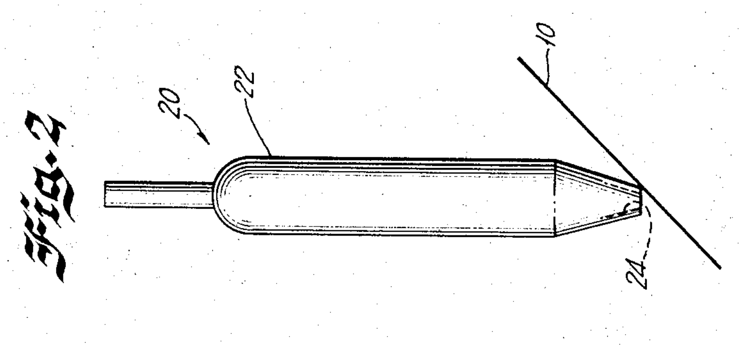
FIG. 2 is an elevational view of a portable reading unit that can be used with the record shown in FIG. 1.

The record 10 can be correctly sensed or interpreted even when the reader 20 is tipped or inclined relative to the record 10 as illustrated in FIG. 2. When the reader 20 is held in this position, the light beam impinges on a generally elliptical area shown as 26 in FIG. 4. However, it has been determined that since the quantity of light reflected to the photocell from the shaded area of the ellipse 26 (FIG. 4) is small, the scanning light spot can still be considered to be substantially circular insofar as its effect on the photocell is concerned.

Since the record card 10 includes the greatly elongated and coextensive nonreflecting areas 12, 14 and reflecting areas 16, when considered relative to the source of light provided by the scanning light beam, there is no need to maintain any appreciable degree of orientation or alignment between the sensing unit 20 and the record 10. The data stored on the record 10 is correctly reproduced or read so long as the sensing unit 20 passes in a single direction along a path or line intersecting both the uppermost and the lowermost of the nonreflective areas 2. As an example, the path of relative movement between the record 10 and the sensing unit 20 can be along the lines identified as A and B in FIG. 1 in the direction indicated by the arrowheads. Further, since the data stored on the record 10 consists of elongated parallel areas, the record 10 can be formed directly on an irregularly shaped article or formed of flexible material which can be badly distorted out of a uniplanar configuration, as when applied to a round or cylindrical object.

In addition, the record 10 can be formed so that the nonreflective areas are of a uniform width with the reflective areas of two different widths representing binary "0's" and "1's". A record 10 of this opposite or reversed type can be formed by producing nonreflective areas of a uniform width spaced one of two different distances from the adjacent nonreflective area so as to define reflective areas of two different widths. In this embodiment, the combination or pattern of different width reflective areas provides the binary coded data record. This record can be read in the same general manner as the record 10 by varying the quantity of light reflected to the photocell in the reading unit 20. However, the waveforms shown in FIG. 5 would be inverted.

Although the present invention has been described with reference to a number of illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A coded data translating system comprising:

a record having a surface;

a series of areas on said surface of alternating light reflectivity types;

each of the areas of one type having a width at least as great as a first width;

the areas of the other type being divided into first and second groups in accordance with a coded representation of the stored data;

each of the areas of the first group having a width at least as great as the first width;

each of the areas of the second group having a width no greater than a second width substantially smaller than the first width;

a record reader responsive to light reflected from the record surface;

and means defining a light conveying aperture for conveying light from the record to said record reader;

said light conveying aperture being large enough to permit said record reader to instantaneously read a region on said surface larger than said second width.

2. A coded data translating system as claimed in claim 1, said light conveying aperture being approximately twice the size of said second width.

3. A coded data translating system as claimed in claim 1, said areas being greatly elongated as compared with their widths and being generally of the same length, said areas of one type being of a uniform width equal to said first width, said areas of the first group of the other type being of a uniform width equal to said first width, said areas of the second group of the other type being of a uniform width equal to said second width, said second width being approximately half as great as said first width, and said light conveying aperture being approximately the size of said first width.

References Cited

UNITED STATES PATENTS

| | | | |
|---|---|---|---|
| 2,224,646 | 12/1940 | Friedman et al. | 209—111 |
| 2,362,004 | 11/1944 | Heidinger | 235—61.6 |
| 3,044,696 | 7/1962 | Feissel | 235—61.12 |

OTHER REFERENCES

Barber, 21 Ways to Pick Data Off Moving Objects, (Reflected Infrared), Control Engineering, October, 1963, page 86.

DARYL W. COOK, *Acting Primary Examiner.*

MAYNARD R. WILBUR, *Examiner.*

A. L. NEWMAN, *Assistant Examiner.*